May 5, 1942.  H. W. HEY  2,282,053
GEAR SHIFTING MECHANISM
Filed Dec. 6, 1938  5 Sheets-Sheet 1

Inventor
HENRY W. HEY

May 5, 1942.  H. W. HEY  2,282,053

GEAR SHIFTING MECHANISM

Filed Dec. 6, 1938  5 Sheets-Sheet 3

Inventor
HENRY W. HEY
By
Attorney

May 5, 1942.  H. W. HEY  2,282,053
GEAR SHIFTING MECHANISM
Filed Dec. 6, 1938     5 Sheets-Sheet 4

Inventor
HENRY W. HEY

Inventor
HENRY W. HEY

Patented May 5, 1942

2,282,053

UNITED STATES PATENT OFFICE 2,282,053

GEAR SHIFTING MECHANISM

Henry W. Hey, Richmond, Va., assignor to Automatic Shifters, Inc., Richmond, Va., a corporation of Virginia Application December 6, 1938, Serial No. 244,287

11 Claims. (Cl. 74—335)

This invention relates to gear shifting mechanisms.

In the copending applications of Henry Baade, Serial Nos. 212,591, filed June 8, 1938, and 228,441, filed September 3, 1938, there are shown and described gear shifting mechanisms for motor vehicles wherein a fluid pressure motor and its control valve mechanism are supported with respect to the steering column. The valve mechanism is connected to be operated by a handle arranged adjacent and beneath the steering wheel and the operation of the motor provides a follow-up action of the valve whereby the shifting movement imparted by the motor takes place to an extent proportionate to the extent of movement of the handle.

The handle of each of the structures of the copending applications referred to is connected to effect rocking movement of an element with respect to the steering column to actuate the control valve and to impart movement of such element longitudinally of the steering column to select either shift rail of the transmission for operation. The prior structures referred to were found to be highly efficient and advantageous in actual practice.

In a gear shifting mechanism having a follow-up control mechanism, it is highly desirable to provide the manually operable handle with "feel" to simulate conventional practice in shifting gears with a lever projecting upwardly from the floorboards of the motor vehicle. Numerous attempts have been made to provide this highly desirable result, but none provides the manually operable handle with accurate "feel." In my copending application Serial No. 169,288, filed October 15, 1937, I have shown and described a follow-up control mechanism for shifting the gears of a motor vehicle wherein a fluid pressure operated device is connected to the handle to provide the latter with a degree of resistance corresponding to the resistance encountered by the shifting motor in performing the actual shifting operations. It was found that differential pressures in the shifting motor will vary in accordance with the degree of resistance encountered in the shifting operation, and the fluid pressure operated device referred to was subjected to pressures corresponding to the pressures in the shifting motor to reproduce fluctuations therein and thus resist operation of the manually operable handle to degrees proportionate to the actual resistance encountered in performing the shifting operations.

In the copending application of Henry Baade, Serial No. 228,441, the follow-up mechanism associated with the valve mechanism includes lever means whereby movement of the manually operable handle not only actuates the valve mechanism but performs a proportionate part of the work required in each shifting operation. With such a mechanism, movement of the handle not only tends to increase the manual force exerted in performing the shifting operation but also operates the valve mechanism to cause the shifting motor to perform a proportionately increased amount of work. Since a part of the force exerted by the hand of the operator performs a proportionate part of the shifting operation, it follows that movement of the handle is resisted to a degree proportionate to the degree of resistance encountered in the shifting operation. Such a mechanism provides the handle with "feel" which may be termed "mechanical feel" as distinguished from the "fluid pressure feel" of my copending application Serial No. 169,288, referred to above.

Each of the systems referred to above for providing the handle with "feel" is quite helpful in simulating conventional gear shifting to permit the operator to "feel" his way past the resistances provided, for example, by the neutral detents in the transmission and by the synchronizing means employed in present day transmissions. While the "fluid pressure feel" is substantially superior in its accuracy to the "mechanical feel" mechanism, each type of mechanism fails in providing complete accuracy in the "feel" afforded in the gear shifting handle. For example, in performing a gear shifting operation, the resistances encountered through the detents and the synchronizing means are rather sudden and fairly substantial, and it is a characteristic of the "fluid pressure feel" type of mechanism that the sudden resistances referred to are somewhat cushioned, thus preventing the operator from being provided with an accurately reproduced "feel" at such particular times. At all other times, the "fluid pressure feel" mechanism is highly accurate in reproducing the resistances encountered in the shifting operations. The "mechanical feel" type of mechanism provides the operating handle with sudden resistances when corresponding resistances are encountered in the gear shifting operations, and is advantageous for this reason over a shifting mechanism employing "fluid pressure feel." However, a mechanism employing "mechanical feel" is disadvantageous under other conditions when the actual shifting resistances are small or substantially zero, there being a tendency for the parts to overrun under such conditions. Therefore, after overcoming the resistance of the neutral detent when shifting from neutral into a gear position, there is a substantial tendency for the operator to move the handle too rapidly into a gear synchronizing position, thus tending to prevent the proper functioning of the synchronizing means.

An important object of the present invention is to provide an apparatus which embodies all of the advantageous characteristics of the apparatus referred to but wherein the structure is substantially simplified and thus rendered more economical to manufacture.

A further object is to provide such an apparatus wherein the motor is adapted to be mounted on and parallel to the axis of the steering column, but wherein the structure is simplified with respect to the structure of application Serial No. 228,441, referred to above.

A further object is to provide a novel motor-valve unit wherein the use of pipes for connecting the valve mechanism to either end of the fluid pressure motor is entirely eliminated.

A further object is to provide a motor-valve unit for a shifting mechanism of the type referred to wherein the motor casing is formed of complementary sections joined at their adjacent edges, and to provide a novel valve mechanism secured to the motor casing adjacent the connected edges thereof and directly communicating with the respective ends of the motor without the use of any pipes and the necessary connections therefor.

A further object is to provide a shifting mechanism of the character referred to wherein the pressure movable element of the shifting motor is in the form of a flexible diaphragm with its edges clamped between the adjacent edges of the complementary sections of the motor casing whereby the edge portions of the diaphragm are immovable, thereby facilitating the connection of the valve mechanism against the side of the motor casing with the fluid passages directly communicating with the respective ends of the motor casing on opposite sides of the diaphragm.

A further object is to provide a simplified means for securing the valve mechanism to the side of the motor casing, thus substantially reducing the expense incident to the assembly of the device.

A further object is to provide a novel angular mounting with respect to the steering column of the lever means which delivers power from the motor to the gear set to reduce the angular transmission of power to the gear set.

A further object is to provide a novel form of spring detent for the neutral position of the manually operable handle, to facilitate the operation of the apparatus.

A further object is to provide a novel shifting mechanism wherein the motor and the leverage means for providing the valve controlling and power delivering mechanism are both supported as a unitary structure by a single support which may be readily attached to the steering column.

A further object is to provide an apparatus of this character wherein the power lever has a power delivery crank arranged in a common vertical plane with the shifting crank of the transmission to directly deliver power thereto through a rod connected between the two cranks.

A further object is to provide a novel follow-up control valve mechanism having dual "feel" means associated therewith and operating in conjunction with each other whereby the shifting handle, under all conditions of operation, is provided with resistance to its movement which accurately reproduces the resistance encountered in the shifting movements, thus providing the handle with more accurate "feel" than has been possible with prior constructions.

A further object is to provide a dual "feel" mechanism of the character referred to wherein one part of the mechanism is mechanical and tends to directly resist movement of the gear shift handle, and the other of which provides resistance to movement of the handle in proportion to the fluid pressures in the gear shifting motor whereby an accurate "feel" is provided in the handle in every operation thereof.

Other objects and advantages of the invention will become apparent during the course of the following description.

In the drawings I have shown several embodiments of the invention. In this showing.

Figures 1, 2, 3:
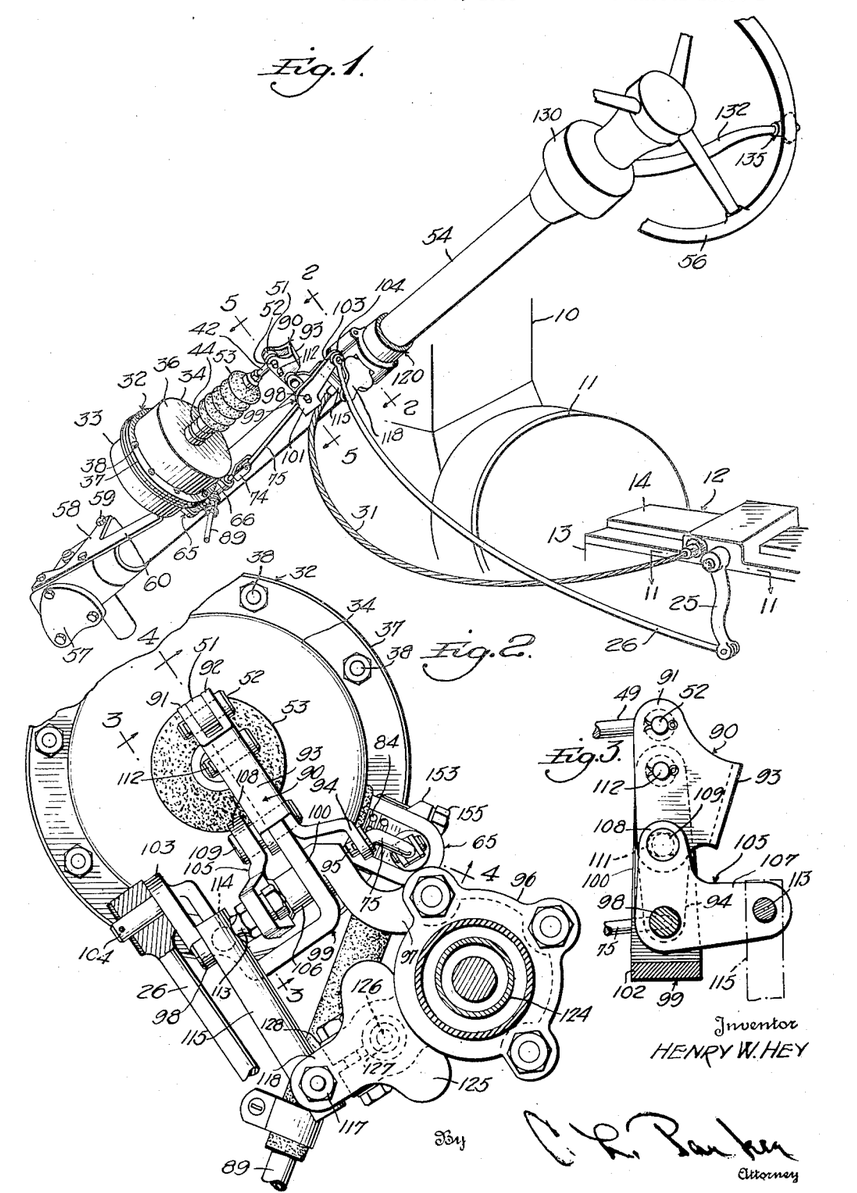
Figure 1 is a perspective view of one type of shifting mechanism associated with certain parts of a motor vehicle, the view being taken looking toward the forward end of the vehicle.
Figure 2 is an enlarged transverse sectional view taken substantially on line 2—2 of Figure 1.
Figure 3 is a detail sectional view on line 3—3 of Figure 2.

Referring to Figure 1 the numeral 10 designates a motor vehicle engine as a whole rearwardly of which is mounted the usual clutch unit 11 followed by a transmission 12. The transmission is shown as including a casing 13 in which are arranged the usual transmission parts (not shown) and the top of the transmission is provided with a cover 14. The transmission contains shiftable members 15 and 16 (Figure 11) shown in the present instance as being shift rails, although it will be apparent that the present invention is not limited to any particular type of transmission. The rail 15 is the first and reverse gear shift rail, and the rail 16 is the second and high gear shift rail. These rails are provided with notches 17 and 18 respectively, engageable by a depending finger 19 carried by a sleeve 20 slidably mounted on a shaft 21.

Figures 8, 9, 10, 11:
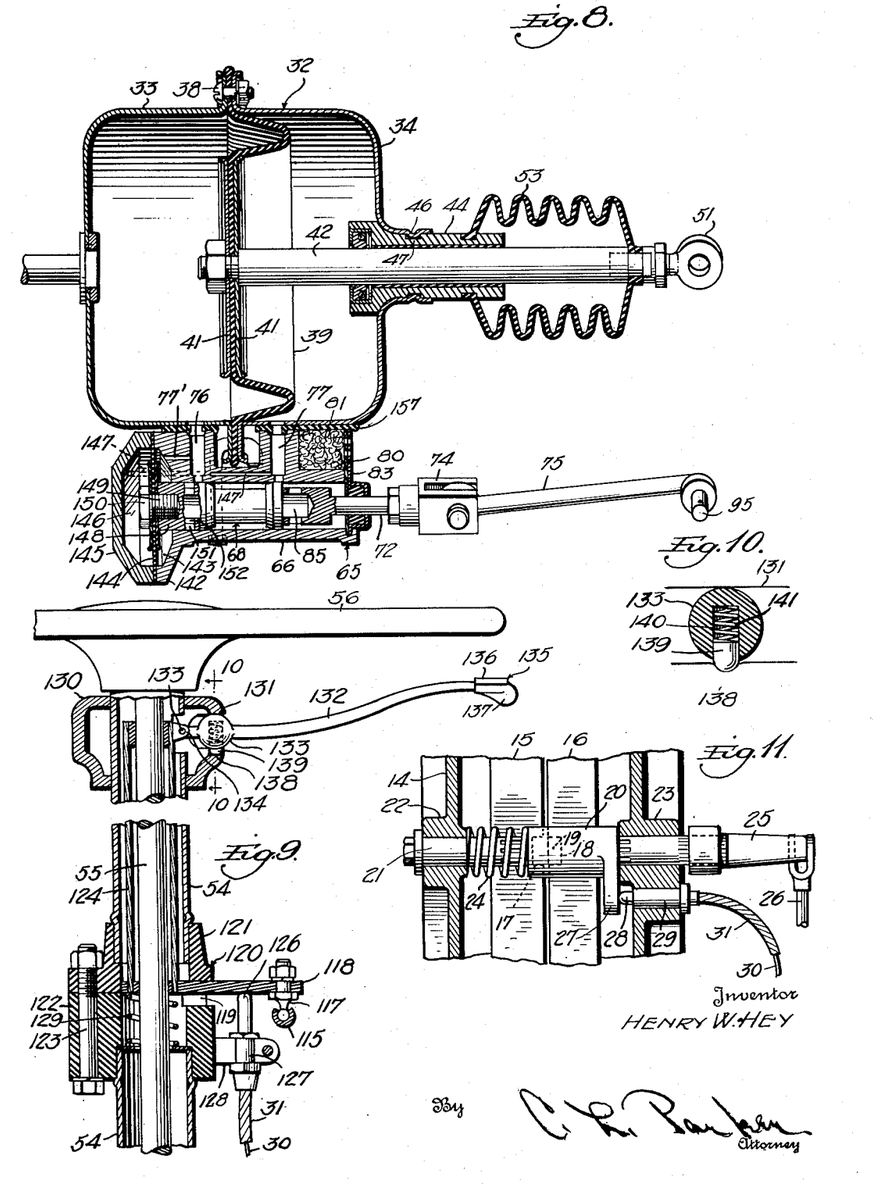
Figure 8 is a sectional view similar to Figure 4 showing a modified form of the invention.
Figure 9 is a sectional view taken axially through the steering column, parts being broken away and parts being shown in elevation.
Figure 10 is a detail sectional view on line 10—10 of Figure 9, parts being shown in elevation.
Figure 11 is a horizontal fragmentary sectional view through a portion of the transmission taken substantially on line 11—11 of Figure 1.

As shown in Figure 11, the shaft 21 is mounted in bearings 22 and 23 formed in the transmission cover 14 and a spring 24 urges the sleeve 20 to a position in engagement with the inner end of the bearing 23 with the finger 19 engaging the notch 18 of the second and high gear shift rail 16. Accordingly the spring 24 biases the sleeve 20 to a position in which either second or high gear will be provided upon the rocking of the sleeve 20. One end of the shaft 21 is provided with a crank 25 operable by a rod 26 (Figures 1 and 11) in a manner to be described whereby the shaft 21 and consequently the sleeve 20 may be rocked to effect movement of one of the shift rails.

The sleeve 20, adjacent the bearing 23, is provided with a laterally extending projection 27 engaged by a pin 28 slidable in a bearing 29 carried by the adjacent side wall of the transmission cover 14. A Bowden wire 30 is slidable in a casing 31 attached to the outer end of the bearing 29, and the Bowden wire is connected to the pin 28. The Bowden wire 30 is operable in a manner to be described upon the exertion of a pushing force thereon, which causes the pin 28 to move the sleeve 20 against the tension of the spring 24 to transfer the finger 19 from the notch 18 to the notch 17 whereby the first and reverse gear shift rail 15 is selected for operation.

Figure 4:
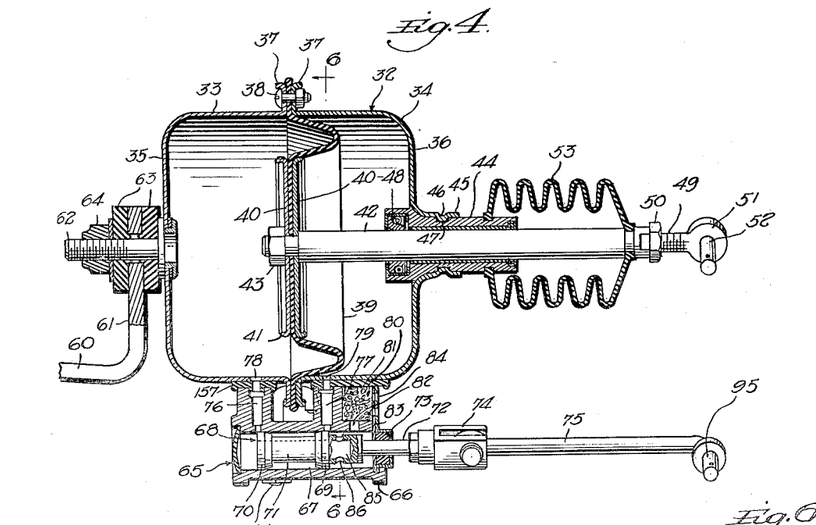
Figure 4 is a central longitudinal sectional view through the motor and associated parts, taken substantially on line 4—4 of Figure 2.

As will be described, the selection of the low and reverse gear shift rail is effected by the manual force of the operator, and novel motor means is provided for rocking the sleeve 20 to shift the selected member 15 or 16. The motor is of the differential fluid pressure type and is designated as a whole by the numeral 32. The motor comprises a pair of complementary sections 33 and 34 each of which is substantially cup shaped as shown in Figure 4. Each complementary section is cylindrical and of equal diameter, and they are provided with heads 35 and 36 respectively. Each of the complementary casing sections 33 and 34 is preferably formed of an integral stamped or drawn steel member, and the adjacent ends of the complementary sections are provided with outstanding annular flanges 37 through which securing bolts 38 extend.

The pressure movable member of the motor is preferably in the form of a flexible diaphragm 39, and the peripheral portion of this diaphragm extends between the flanges 37. Obviously, the bolts 38 clamp the flanges 37 against the diaphragm 39 to provide the motor casing with a leak-proof joint. The central portion of the diaphragm is clamped between disks 40, as shown in Figure 4, the edges of the disks preferably being turned as at 41 to provide curved surfaces engageable against the diaphragm. A rod 42 is secured as at 43 to the diaphragm and is slidable in a preferably cast bearing 44 mounted in a tubular extension 45 formed on the complementary section 34. The extension 45 may be circumferentially grooved as at 46 to provide a suitable bead engageable in an annular groove 47 formed in the bearing 44 to fix the latter against movement with respect to the casing section 34. A suitable packing gland 48 is preferably arranged in the inner end of the bearing 44.

The outer end of the rod 42 receives a threaded stem 49 secured in adjusted positions by a nut 50. The stem 49 carries a bearing eye 51 at its end to receive a pin 52 by means of which the rod 42 is operably connected to lever means to be described. A flexible collapsible boot 53 is secured at its ends respectively to the bearing 44 and to the rod 42 adjacent the outer end thereof to exclude dust and other foreign material from the bearing 44.

The motor 32 is supported parallel to the steering column 54 of the vehicle (Figure 1) the steering column being provided with the usual steering post 55 surmounted by a steering wheel 56. The steering post is provided with the usual gear casing 57 (Figure 1) which is usually covered by a cover plate which is eliminated in the present construction. In place of the cover plate, a plate 58 is employed which is secured in position on the gear housing 57 by screws 59. The plate 58 is provided with a rigid integral extension 60 (Figures 1 and 4) the free end of which turns upwardly at right angles to the steering column as at 61 to provide supporting means for the motor 32. A stud 62 extends through the bracket end 61 and rubber washers or pads 63 are arranged on opposite sides of the extension 61. A nut 64 is threaded on the outer end of the stud 62, as shown in Figure 4. The means for supporting the motor 32 is elastic in view of the provision of the rubber pads 63, and such an arrangement permits the motor 32 to partake of the necessary movement incident to variations in the position of the pin 52, as will be described.

A valve mechanism indicated as a whole by the numeral 65 controls the operation of the motor 32. The valve mechanism includes a body 66 preferably formed by die casting and provided with a bore 67 receiving a valve indicated as a whole by the numeral 68. The valve includes spaced heads 69 and 70 connected by a reduced shank 71, the inner ends of the valve heads being tapered to decrease in size as indicated in Figure 4. The valve is provided with a reduced stem 72 projecting through suitable packing 73 and provided at its end with a yoke 74 to which is pivotally connected a rod 75 operated in a manner to be described.

The portion of the valve body in which the bore 67 is formed is offset outwardly from the motor 32 as shown in Figure 4 and the valve body is provided with two passages 76 and 77 communicating with the interior of the respective motor casing sections 33 and 34 through openings 78 and 79 respectively. The outer ends of the passages 76 and 77 terminate in spaced ports communicating with the bore 67. The portion of the valve body in which the port 77 is formed is provided with a pocket 80 in which is arranged filtering material 81. This pocket communicates with the bore 67 through an atmospheric port 82. The packing 73 is arranged in a space provided between two sheet metal members 83 carried by the adjacent end of the valve body and these members are provided with openings 84 to admit air to the filtering material 81. The valve 68 is provided with an axial passage 85 communicating through radial openings 86 with the space around the right hand end of the valve as viewed in Figure 4. Accordingly, it will be apparent that this space directly communicates with the passage 77 when the valve is moved to the left of the position shown in Figure 4 and that air flows through the axial passage 85 and into the passage 76 when the valve is moved to the right of the position shown.

The space between the valve heads 69 and 70 is the vacuum space of the valve body and is adapted to communicate with the passages 66 or 67, depending upon the direction of movement of the valve 68. A nipple 87 communicates with the vacuum space and is provided with a rubber or similar flexible tube 88 to connect it to a pipe 89 leading to the intake manifold (not shown) of the engine 10.

A lever 90 (Figures 1, 2, 3 and 5) is formed of parallel arms 91 and 92 joined by an integral yoke 93 whereby the arms 91 and 92 are fixed rigidly in position. The upper ends of the lever arms 91 and 92 are connected to the pivot pin 52. At its lower end, the lever arm 92 is provided with an offset extension 94 the movement of which actuates the valve 68. Referring to Figure 4 it will be noted that the valve operating rod 75 has its free end turned inwardly as at 95 and such end of the rod 75 is connected to the extended end 94 of the lever arm 92.

Figures 5, 6, 7:
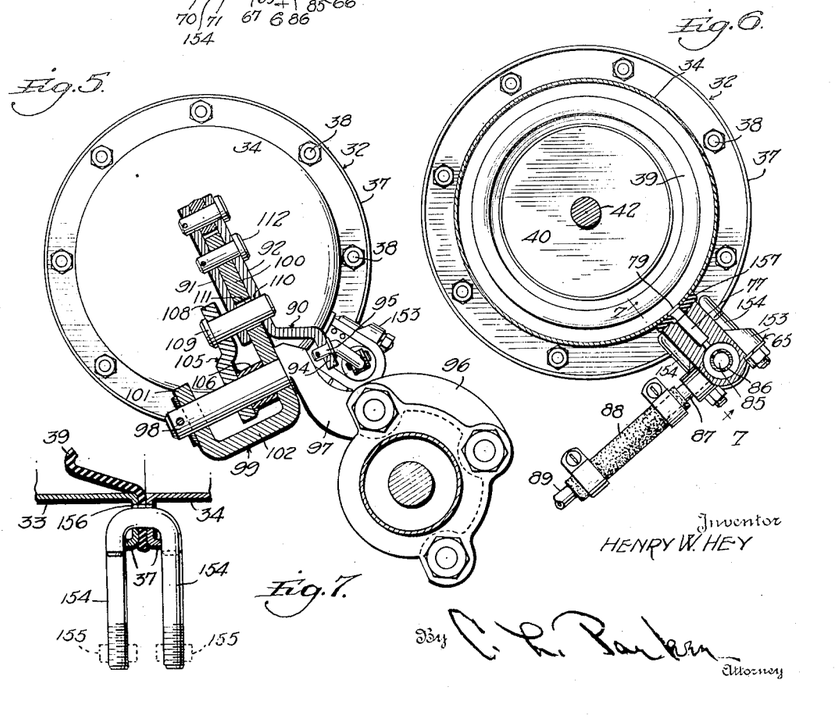
Figure 5 is a transverse sectional view taken substantially on line 5—5 of Figure 1.
Figure 6 is a similar view on line 6—6 of Figure 4.
Figure 7 is a detail sectional view on line 7—7 of Figure 6 showing the attaching means for the valve mechanism, parts being omitted.

A bracket 96 surrounds and is secured to the steering column and is provided with a rigid arm 97 carrying a relatively heavy pin 98 (Figure 5). This pin supports a power lever indicated as a whole by the numeral 99. The power lever, in the plane of section of Figure 5, is substantially J-shaped and includes a relatively long arm 100 and a shorter arm 101 spaced from and parallel to the arm 100 and integrally connected thereto by a yoke portion 102. The pin 98 extends through both of the arms 100 and 101, as clearly shown in Figure 5, thus providing spaced pivot points for the lever 99 to prevent any wobbling thereof. The lever arm 101 is provided with an angularly projecting integral arm 103 (Figure 1) to which the forward end of the rod 26 is pivotally connected as at 104.

A manually operable bell crank lever indicated as a whole by the numeral 105 (Figures 3 and 5) is pivotally supported on the pin 98 and is preferably provided with a bushing 106 welded thereto to form a bearing receiving the pin 98. The bell crank lever includes a pair of arms 107 and 108 the latter of which carries a pin 109 rigidly fixed thereto and extending through openings 110 formed in the lever arms 91 and 92. The pin 109 also extends through an opening 111 in the lever arm 100 and this opening is elongated transversely of the lever arm 100 as shown in dotted lines in Figure 3. The lever arm 100 is pivotally connected to the lever arms 91 and 92 by a pin 112.

The manually operable bell crank lever arm 107 is provided with a stud 113 having a ball and socket connection 114 with a link 115 and the other end of this link has similar connection with a stud 117 (Figures 2 and 9) carried by a plate 118. This plate projects through an opening 119 formed in a housing 120 carried by the steering column 54. The housing 120 is formed of a pair of sections 121 and 122 secured together by bolts 123, the lower face of the housing 121 forming the upper limit of the opening 119 and against which the plate 118 is normally engaged. In this connection it will be noted that the steering column 54 is preferably formed of alined sections respectively secured to the housing sections 121 and 122.

A tubular operating member 124 (Figure 9) surrounds the steering post and is rotatable and slidable thereon. The plate 118 is secured to the lower end of the tube 124 and it will be apparent that upon rocking movement of this tube, the link 115 will be actuated to swing the bell crank lever 105. Sliding movement of the tube 124 is utilized to effect the selection of the shift rails 15 and 16. For this purpose, the plate 118 is provided with a widened portion 125 engaging a stud 126 slidable in a bearing 127 carried by a split bracket 128 preferably formed integral with the housing section 122. The stud 126 is connected to the Bowden wire 30 leading to the transmission. Thus, upon downward movement of the plate 118 from the position shown in Figure 9 the Bowden wire 30 will be pushed to slide the sleeve 20 (Figure 11) and thus move the finger 19 into the notch 17. This action takes place against the tension of the spring 24 and also preferably against the tension of a light spring 129 (Figure 9) which urges the tube 124 upwardly.

The upper end of the steering column is provided with a housing 130 having a circumferentially elongated opening 131 in one side thereof. A lever 132 is provided with a ball 133 corresponding in height to the opening 131 and arranged therein. The inner end of the lever 132 is pivotally connected as at 133 to ears 134 carried by the upper end of the tube 124. The lever 132 is preferably provided at its end with a handle element 135 similar to the handle element shown in the copending applications of Henry Baade referred to above. Such handle element preferably includes a flange 136 parallel to the steering wheel and a flange 137 at right angles thereto, the flange 137 preferably extending radially outwardly beyond the flange 136 as shown in Figure 9 to facilitate engagement of the fingers of the operator therewith independently of the flange 136.

As shown in Figures 9 and 10, the lower edge of the opening 131 is notched as at 138 to receive a detent 139 slidable in an opening 140 formed in the ball 133, the detent being backed up by a small spring 141. The detent 139 is arranged in the notch 138 when the handle lever 132 is in neutral position, as will become apparent.

As will become apparent, the mechanism described includes "mechanical feel" means for providing the handle lever 132 with the highly desirable "feel" which assists the operator in performing the various shifting operations. Such mechanism is fully operative in itself, but as previously stated, a "mechanical feel" system does not provide the handle lever with accurate feel under all conditions. Accordingly, the valve mechanism described may be of the modified type shown in Figure 8 to combine the "mechanical feel" of the form of the invention shown in Figures 1 to 7, inclusive, with "fluid pressure feel." Inasmuch as the form of the invention shown in Figure 8 is identical with that previously described except for the "fluid pressure feel" means, the same numerals are employed for designating the parts which are identical.

The valve casing 66 in the form of the invention shown in Figure 8 has the end thereof remote from the stem 72 circumferentially enlarged to form a flange 142 within which is a pressure chamber 143 communicating with the passage 76 through a small passage 77'. A diaphragm 144 is arranged against the flange 142 and a cover 145 has its edge portion engaging the flange 142 to form therewith a pressure chamber 146. The cover 145 is secured to the flange 142 by suitable screws (not shown). The chamber 146 communicates with the passage 77 by a passage schematically shown in Figure 8 and designated by the numeral 147.

The valve 68 in Figure 8 has the end thereof adjacent the diaphragm 144 provided with an internally threaded extension 148 to receive a threaded plug 149 having a polygonal head 150 by means of which the diaphragm is secured to the valve. Inasmuch as the plug 149 closes the adjacent end of the valve, the latter is provided with a circumferential groove 151 communicating through radial passages 152 with the passage 85 extending through the valve.

Attention is particularly invited to the particular mountings of the valve bodies of both forms of the invention, such means providing adequate securing means and permitting the assembling of the valve with respect to the motor in a minimum length of time. The valve body in either case is provided with integral extensions 153 preferably two in number. The extensions 153 are preferably arranged on opposite sides of a transverse plane through the motor between the flanges 37. Each projection 153 receives the long end of a hook bolt 154 and such ends of the bolts carry nuts 155 adapted to be tightened against the projections 153. The hook end of each bolt passes through alined openings 156 in the respective flanges 37 and in the peripheral portion of the diaphragm 39. A rubber or similar deformable packing member or gasket 157 is arranged between the valve body and the casing sections of the motor and when the hook bolts are drawn up tight, the packing 157 adequately prevents leakage from the ports 76 and 77. In both forms of the invention, the portions of the valve body in which the passages 76 and 77 are formed are spaced as shown in Figures 4 and 8 to receive the adjacent portions of the flanges 37.

Figure 12:
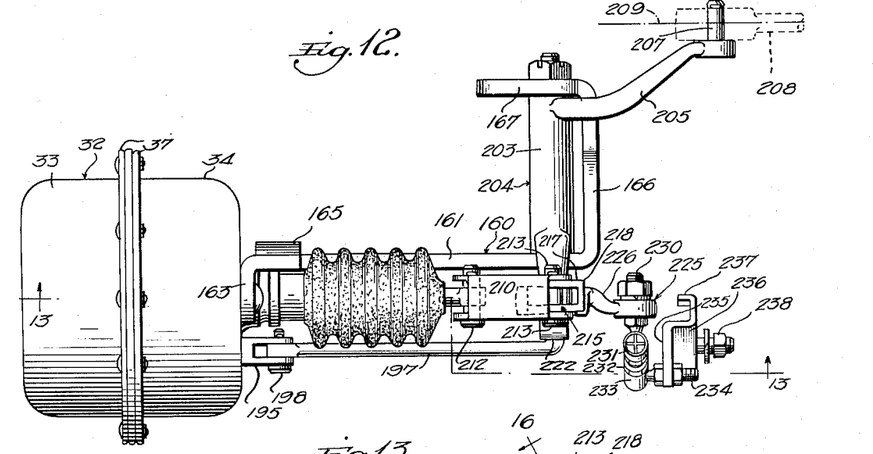
Figure 12 is a plan view of a further modified form of apparatus.
Figures 13, 14, 17:
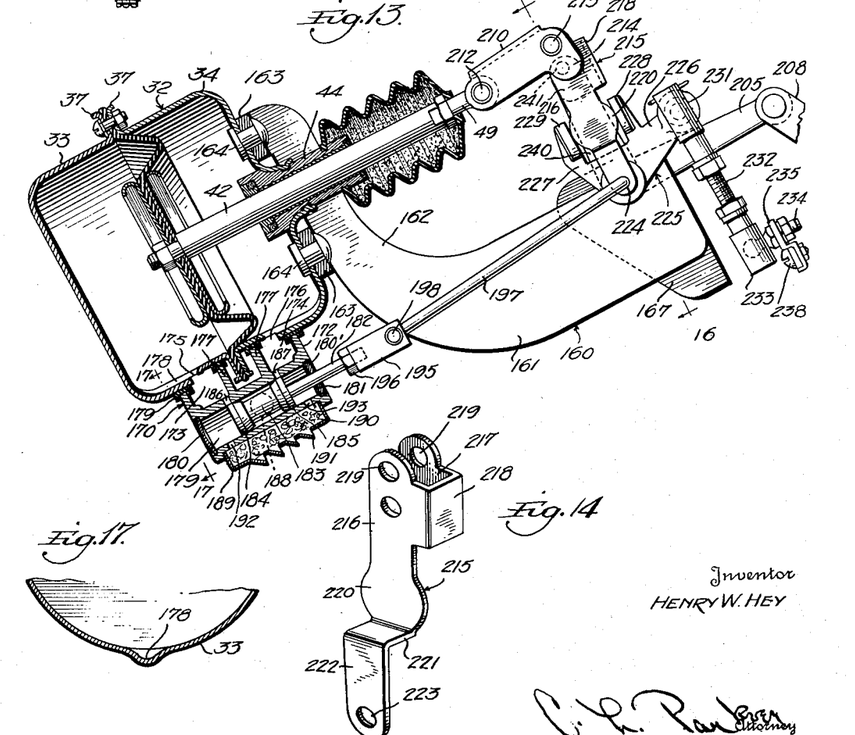
Figure 13 is a vertical longitudinal sectional view taken substantially on line 13—13 of Figure 12, parts being shown in elevation.
Figure 14 is a detail perspective view of one of the elements of the lever mechanism.
Figure 17 is a fragmentary sectional view on line 17—17 of Figure 13.
Figure 15:
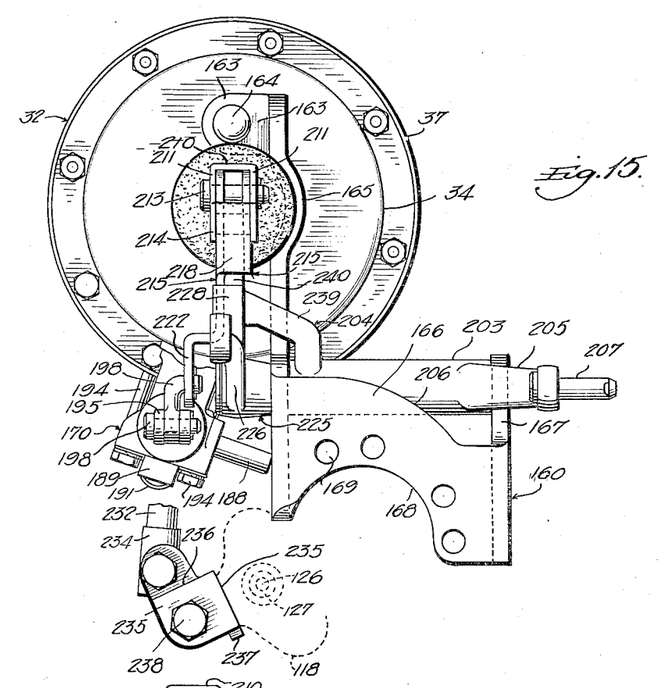
Figure 15 is an end elevation of the modified form of mechanism, parts being broken away.

The form of the invention shown in Figures 12 to 16, inclusive, also is highly advantageous in actual practice. The motor and associated parts employed in such form of the invention, except as hereafter noted, are identical with the motor described in connection with the other forms of the invention and corresponding parts have been indicated by the same numerals. Referring to Figures 12 and 13 the numeral 160 designates a rigid supporting bracket as a whole having a main body portion 161 one end of which turns upwardly as at 162 and terminates in a pair of integral laterally extending arms 163 riveted or otherwise secured as at 164 to the adjacent motor casing section 34. The upwardly extended portion 162 of the support 160, at the point where it extends across the bearing 44, may be bowed outwardly as at 165 (Figures 12 and 15).

At the end opposite the motor, the support 160 is provided with an integral laterally extending portion 166 and the free end of the support is turned back as at 167 to form an arm parallel to the body portion 161 of the support. The transversely extending bracket portion 166 is shaped as clearly shown in Figure 15, being provided with an arcuate cutout portion 168 adjacent which are drilled openings 169 to receive bolts (not shown) whereby the support may be secured against the lower face of the housing section 122 of the steering column (Figure 9). Accordingly it will be apparent that the support 160 is rigidly fixed to the steering column and forms a rigid support for the motor.

The valve mechanism for the motor is indicated as a whole by the numeral 170 and is very similar to the valve mechanism previously described. The valve mechanism comprises a valve body 172 having a pair of pockets 173 and 174 therein communicating with the respective motor casing sections through openings 175 and 176. The pockets or recesses 173 and 174 are defined by inner walls 177 which are spaced to allow for the projection of the adjacent portions of the flanges 37 therebetween. The inner edges of the walls 177 are curved to correspond to the cylindrical shape of the motor casings 33 and 34 and project inwardly slightly beyond the central portions of the ends of the valve body. In this connection, attention is invited to the fact that the portions of the casing sections 33 and 34 between the respective ports 175 and 176 and the ends of the casing sections are offset slightly outwardly radially of the motor as indicated by the numeral 178 (Figure 17) for a purpose to be described.

The valve body is provided with a bore 179 capped at one end as at 180 and the other end of the bore is provided with a small metallic closure 180' provided with a filling of packing material 181 to provide a leak-proof joint around a valve stem 182. Within the bore 179, the valve stem is connected to the valve body 183 having heads 184 and 185 adapted to control ports 186 and 187 communicating with the respective chambers 173 and 174. The space between the heads 184 and 185 is the vacuum space of the valve mechanism and communicates through a nipple 188 (Figures 13 and 15) with the intake manifold of the vehicle engine through a suitable pipe (not shown).

Instead of being provided with an air cleaner of the form shown in Figures 4 and 8, the valve mechanism in Figure 13 is provided with a sheet metal casing 189 filled with suitable air cleaning material 190 and provided in its outer face with struck-out lips or louvres to admit air to the cleaning material 190. Air is adapted to flow into the ends of the bore 179, beyond the valve heads 186 and 187, through suitable ports 192 and 193. The valve body is secured to the motor flanges 37 by bolts 194 (Figure 15) similar to the bolts 154 previously described.

It will be apparent that movement of the valve toward the left as viewed in Figure 13 will uncover the port 186 to the vacuum space and will uncover the port 187 to the atmosphere. Reverse movement of the valve will connect the port 187 to the vacuum space and will admit air through the port 186. For the purpose of operating the valve, the stem 182 is provided with a yoke 195 threaded thereon and provided with a jamb nut 196 whereby the yoke may be turned up to adjusted positions on the valve stem and secured in the desired position. An operating rod 197 is pivotally connected as at 198 to the yoke 195, and the other end of the rod 197 is connected by means to be described.

Figure 16:
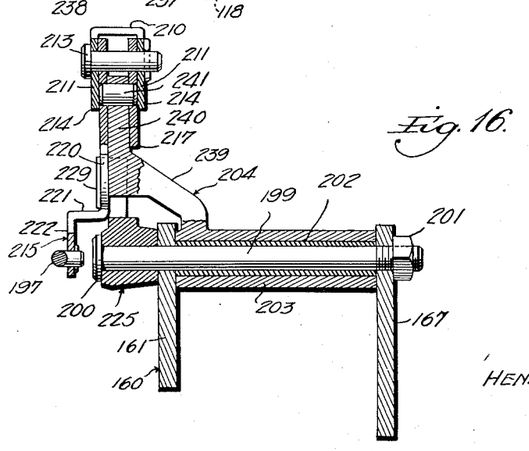
Figure 16 is a sectional view on line 16—16 of Figure 13.

Referring to Figure 16, it will be noted that the parallel portions of the support 160 form supporting means for a shaft 199 which is provided at one end with a head 200 and at its opposite end with a nut 201 threaded thereon. Between the support portions 161 and 167 the shaft 199 is preferably surrounded by a bearing sleeve 202 to rotatably support a sleeve 203 forming a portion of a power lever indicated as a whole by the numeral 204. Adjacent one end, the power lever sleeve 203 is provided with a crank arm 205 (Figures 12 and 15) and the upper edge of the transverse bracket member 166 is curved downwardly as at 206 to provide space for the swinging movement of the crank 205. This crank has its free end offset laterally away from the steering column and provided with a pivot pin 207 connected to the adjacent end of a rod 208. This rod corresponds to the rod 26 (Figure 1) and has its other end directly connected to the crank 25 of the transmission. The broken line 209 in Figure 12 indicates a vertical plane extending longitudinally of the vehicle and coinciding approximately with the plane of movement of the free end of the crank 25. Thus it will be apparent that the free end of the crank 205 (Figure 12) and the free end of the crank 25 (Figure 1) swings substantially in the same plane, thus providing for an efficient transmission of power between these cranks without any loss incident to turning corners or transmitting around angles.

A link 210, preferably formed U-shape in cross section to provide parallel arms 211 (Figure 15), is pivotally connected at one end as at 212 to the stem 49 and is provided adjacent its other end with a pivot pin 213. Both sides of the link 210 extend downwardly below the pivot pin 213 as at 214, for a purpose to be described. A floating lever indicated as a whole by the numeral 215, and shown in detail in Figure 14, is provided with an elongated arm 216 and a shorter parallel arm 217 connected to the arm 216 by a yoke portion 218. The upper ends of the two arms 216 and 217 are provided with openings 219 to receive the pivot pin 213 whereby the floating lever 215 is pivotally connected at its upper end to the link 210. Intermediate its ends, the lever arm 216 is enlarged into a substantially circular portion 220, for a purpose to be described. Below such enlarged portion, the lever arm 216 extends laterally as at 221 and then downwardly as at 222, and such lower end 222 is provided with an opening 223 to receive the inturned adjacent end of the rod 197 to provide a pivotal connection 224 (Figure 13).

As shown in Figure 16, the shaft 199 extends beyond the body portion 161 of the support 160 and pivotally supports a bell crank lever indicated as a whole by the numeral 225 and including arms 226 and 227. The arm 227 is bifurcated to provide spaced parallel face members 228 and 229 engaging opposite edges of the circular enlargement 220 of the floating lever. The arms 226 of the bell crank lever is provided with a stem 230 (Figure 12) the outer end of which has a conventional ball and socket connection indicated as a whole by the numeral 231 with an operating link 232. The lower end of this link has a similar ball and socket connection 233 with a stem 234 carried by a metal clip 235. The clip 235 has its ends offset by providing a shoulder 236 and the lower end of the clip is provided with a finger 237 defining with the shoulder 236 a space to receive the projecting end of the plate 118, this plate being identical with that previously described. The projecting end of the plate is secured to the clip 235 by a bolt 238. The clip 235 is preferably used in the particular installation illustrated to offset the lower end of the link 232 from the plate 18 to preserve a substantially parallel relation between these elements.

The power lever 204 is provided at the end thereof adjacent the bell crank lever 235 with an arm 239 extending upwardly and angularly to the left as shown in Figure 16 and terminating in a lever arm 240 which lies parallel to and between the arms 216 and 217 of the floating lever. The upper end of the lever arm 240 is connected by a pivot pin 241 to the two arms of the floating lever, the ends of this pin being covered by the downwardly projecting link portions 214 to be retained in position thereby. It will be noted that the lower end portion of the lever arm 240 lies between the bifurcated ends of the bell crank lever arm 227 but is narrower than the circular enlargement 220. Accordingly the bell crank lever is free to swing between predetermined limits of the lever arm 240 but cannot be turned without imparting movement to the floating lever through the circular enlarged portion 220, which operation will be referred to later.

The operation of the form of the invention shown in Figures 1 to 7 inclusive, 9, 10 and 11 is as follows:

Assuming that the gear set parts are in the position shown in Figure 11 with both shift rails in neutral and with the finger 19 in its biased position in engagement with the notch 18, the operator may shift into low gear by moving the handle lever 132 toward the steering wheel and then downwardly and rearwardly parallel thereto. The operator will hook his fingers beneath the flange 136 (Figure 9) to move the handle toward the steering wheel to select the low and reverse gear shift rail for operation, and this movement, as is true of all movements of the handle 135, may be effected without any necessity for the operator removing his hand from the steering wheel. Upward movement of the handle 135 causes downward movement of the inner end of the lever 132 and effects corresponding movement of the tube 124, the ball 133 rocking in the opening 131.

Downward movement of the tube 124 (Figure 9) obviously transmits similar movement to the plate 118 and this plate pushes downwardly against the stud or button 126 to move the Bowden wire 30 and thus cause movement of the sleeve 20 to the left as viewed in Figure 11. The notches 17 and 18 being in alinement with each other, the sleeve 20 will move against the tension of the spring 24 to transfer the finger 19 from the notch 18 to the notch 17 of the low and reverse gear shift rail 15.

The low and reverse gear shift rail thus having been selected for operation, the handle lever 132 may be moved downwardly and rearwardly parallel to the steering wheel to effect the shift into low gear. The operator will exert a force transversely against the flange 137 to perform this operation. Movement of the lever 132 to shift into low gear will be clockwise movement as viewed in Figure 1, thus causing the plate 118 to turn in a clockwise direction to move the link 115 upwardly. Referring to Figure 3 it will be noted that movement of the link 115 in the manner described turns the bell crank lever 105 in a counterclockwise direction this lever turning on the pin 98. Since the pin 109 operates in the slot 111 to provide lost motion between the lever arm 108 and the lever arm 100, it will be apparent that initial turning movement of the bell crank lever 105 will not transmit any movement to the lever arm 100.

The pin 109 is pivotally connected to the lever arms 91 and 92, however, and movement of the bell crank lever will transmit movement to the lever arms 91 and 92 and the extension 94 of the lever arm 92 will move the rod 75 to the left as viewed in Figures 1 and 4, thus similarly moving the valve 68. This movement causes the valve head 69 (Figure 4) to uncover the inner end of the passage 77 to a greater extent to admit air thereinto, while the tapered portion of the valve head 70 will uncover the adjacent end of the passage 76 to connect the latter to the vacuum space between the heads 69 and 70. Thus air will be exhausted from the motor casing section 33 and atmospheric pressure in the casing 34 will cause the diaphragm 39 to move toward the left in Figure 4 to transmit similar movement to the pivot pin 52 and consequently to the upper ends of the lever arms 91 and 92.

Thus it will be apparent that the pivot pin 109 (Figure 3) is moved to the left by the operator while the pin 52 is moved to the left by the motor and these two forces, combining through the lever arms 91 and 92 move the pivot pin 112 to the left to turn the lever 99 in a counterclockwise direction about its supporting pin 98. The lever arm 103 (Figure 1) will thus be moved upwardly and forwardly to transmit a corresponding force through the rod 26 to the crank 25, this crank being turned in a clockwise direction as will be apparent. Movement of the crank 25 actuates the shift rail 15 to move the latter toward low gear position.

It will be apparent that operation of the motor moves the pin 52 in the same direction that movement is being imparted by the operator to the pin 109 and if movement of the latter pin is stopped, a slight additional movement of the pin 52 incident to further operation of the motor will cause the lever arms 91 and 92 to turn in a counterclockwise direction about the pin 109 to move the lever projection 94 to the right as viewed in Figure 3 and thus restore the valve 68 to its neutral position. So long as movement is transmitted to the pin 109 by the operator, the motor will continue to operate, and movement of the motor will be arrested substantially immediately upon the stopping of movement of the pin 109 by the operator. Accordingly, the lever mechanism provides an effective follow-up action of the valve 68 to cause the motor to partake of movement proportionate to the movement of the handle lever 132.

It also will be apparent that the pivot pin 112 is located closer to the pin 52 than to the pin 109, and while the operator performs part of the actual work of shifting, such proportion is a minor one and may be any proportion of the total amount of shifting work depending upon the relative location of the three pivots 52, 112 and 109. Of course, any resistance encountered in the shifting operation will tend to retard movement of the pin 52 by the motor, thus causing the operator to exert a greater force upon the pin 109 to cause a greater valve opening to increase the power of the motor and thus overcome the resistance encountered in the shifting operation. Accordingly, the operator, with the arrangement of the parts described, will not only perform a predetermined proportion of the work involved in the shifting operation, but will also feel a resistance to movement of the handle lever 132 which is proportional to the resistance encountered in the shifting operation. Since this is obviously true for any shifting movement, the description of this operation need not be repeated.

The low gear position of the handle lever 132 is reached when the ball 133 reaches the corresponding end of the slot 131, whereupon the follow-up action described causes the valve 68 to return to neutral position balancing pressures in opposite ends of the shifting motor. It will be apparent that the selection of the shift rail 15 will have been made by causing the plate 118 (Figure 9) to exert a downward force on the stud 126, and as soon as the finger 19, in moving the shift rail 15, has moved a sufficient distance to prevent the spring 24 from transferring the finger 19 back into the notch 18, the operator may release the upward force exerted on the handle flange 136. At any time between such point and the low gear position of the handle 135, therefore, the handle is free to drop away from the steering wheel under the action of the biasing spring 129. Thus, with the gear set in low gear, the handle 135 may be arranged in its plane of movement remote from the steering wheel, that is, the plane in which the shift between second and high gears takes place.

After the vehicle clutch has been engaged and acceleration has taken place to the proper extent, the operator may move the handle 135 upwardly and forwardly parallel to the plane of the steering wheel to effect the shift into second gear. Under such conditions the lever 132 will turn in a counterclockwise direction as viewed in Figure 1, thus causing the plate 118 to turn in the same direction and pull downwardly on the link 115, thus causing the bell crank lever 105 (Figure 3) to turn in a clockwise direction about the supporting pin 98. This operation is the reverse of the previously described operation for shifting into low gear, the pin 109 being moved to the right in Figure 3 to cause similar movement of the lever extension 94 and rod 75 (Figure 4). The valve 68 thus will be moved to increase communication between the passage 76 and the atmosphere and to uncover the passage 77 to the vacuum space. Atmospheric pressure in the motor casing 33 will then move the diaphragm 39 to the right to similarly move the pin 52 and the upper ends of the lever arms 91 and 92. Obviously the pin 52 will be operated by the motor to move in the same direction as manual movement is being imparted to the pin 109 and the combined forces exerted upon the pins 52 and 109 will move the pin 112 and thus rock the lever 99 in a clockwise direction (Figure 3) about its supporting pin 98. Thus the arm 103 (Figure 1) will move downwardly and rearwardly to exert a push on the rod 26 and turn the crank 25, in a counterclockwise direction.

The turning movement of the crank 25 obviously moves the shift rail 15 back toward neutral position and this movement will continue so long as the handle lever 132 is turned in a counterclockwise direction as viewed in Figure 1, until neutral position is reached, at which point the detent 139 (Figures 9 and 10) will drop into the notch 138. As previously stated, the handle 135 will have been movable downwardly away from the steering wheel in the low gear position and accordingly it is not necessary for the handle to cross over by moving away from the steering wheel when the neutral position is reached. When the sleeve 20 (Figure 11) reaches neutral position, however, the spring 24 will move the finger 19 into the notch 18 thus selecting the second and high gear shift rail 16 for operation.

In connection with the operation of the detent 139, it will be noted that the usual transmission neutral detent is relatively strong in a conventional manually shifted transmission. While the present apparatus provides accurate "feel" the resistance to the hand of the operator is only a fraction of what is present in conventional shifting mechanisms, and accordingly the resistance offered by the neutral detent of the transmission is substantially reduced. In order to prevent the operator from possibly hurrying the shift past neutral position, the detent 139 is provided to increase the resistance which will be felt in neutral position, thus very definitely advising the operator that such position has been reached. In the shift between first and second gears, and after the neutral position has been reached, further movement of the handle lever upwardly and forwardly parallel to the steering wheel will accomplish the desired shift into second gear. The operation of the parts will be the same as described for the movement between low gear and neutral, except that the finger 19 will move the shift rail 16 and accordingly such operations need not be described. The follow-up action will cause the motor to operate in accordance with movement of the handle lever 132 until the second gear position is reached, whereupon movement of the handle lever will be stopped and a slight additional movement of the motor diaphragm will move the pin 52 to the right as viewed in Figure 3 to restore the valve 58 to its neutral position.

After the vehicle clutch has been engaged and the vehicle has been accelerated to the desired extent in second gear, the vehicle clutch may be disengaged and the handle lever 132 may be pulled downwardly and rearwardly parallel to the steering wheel, without being moved toward or away from the steering wheel, to effect the shift into high gear. The leverage mechanism and the motor will partake of the same operations as for the shift from neutral into low gear position and the description of the operation of these parts need not be repeated. Of course, instead of the shift rail 15 being actuated, the shift rail 16 will be returned from its second gear position to the neutral position and then will move on into the high gear position. At the latter point, movement of the handle 135 obviously will be stopped and the valve 68 will be restored to neutral position in the same manner as for low gear.

The operation for reverse gear will be the same as for second gear so far as the operation of the motor and lever mechanism is concerned. In the neutral position, the operator will lift the handle 135 toward the steering wheel to select the low and reverse gear shift rail for operation, whereupon he will move the handle 135 upwardly and forwardly parallel to the steering wheel. This operation, as stated, is the same as for second gear except that the shift rail 15 instead of the shift rail 16 will be moved, and accordingly reverse gear will be provided. When such position is provided, the handle 135 will be free to drop away from the steering wheel to the second and high gear plane, the plate 118 being free to move upwardly while the finger 19 will be retained in the notch 17. When the handle 135 is returned to neutral position, such movement may take place in the second and high gear plane and when neutral position is reached, the registration of the notches 17 and 18 will permit the spring 24 to move the finger 19 into the notch 18.

The upward biasing of the tube 124 (Figure 9) by the spring 129 or any suitable similar means and the engagement of the plate 118 against the button 126 permits the handle 135 to drop downwardly away from the steering wheel in either the reverse or first gear positions. This is desirable particularly in connection with low gear since it makes it impossible for the operator, when moving out of first gear, to inadvertently move forwardly into the reverse gear position and thus cause damage to the parts. It will be apparent that when neutral position is reached the spring 24 (Figure 11) will always immediately and rapidly move the finger 19 into the notch 18 if it is not already arranged in such position.

As previously stated, the lever mechanism shown in Figures 1, 2, 3 and 5 provides "mechanical feel" for the handle lever 132. The operation thus provided is highly desirable in that it simulates to a substantial extent the conventional operation of a gear shift lever projecting upwardly from the floor boards. Instead of the operator being able to move the handle 132 freely and thus causing the shift to take place too rapidly, he is enabled to "feel" his way into each gear position as well as out of neutral position, the transmission being provided with the usual neutral detents (not shown) supplemented by the neutral detent 139. Since the operator actually transmits a positive force through the pin 109 to assist in the gear shifting operations, it will be apparent that any sudden and substantial resistances, such as the overcoming of the spring detents and the engagement of the synchronizing means, will be immediately and positively sensed by the operator as in conventional shifting. Such a mechanism is slightly disadvantageous, however, for the reason that once a substantial resistance has been overcome, there will be a tendency for the parts to overrun and move too rapidly.

The "feel" mechanism shown in the embodiment of the invention in Figure 8 is the same in principle as the mechanism shown in my copending application Serial No. 169,288, referred to above. When the valve 68 (Figure 8) moves to the left the motor casing 33 will be connected to the source of vacuum and the casing 34 will be connected to the atmosphere to move the diaphragm 39 to the left. The chamber 143 communicates with the passage 76 while the chamber 146 communicates with the passage 77. Therefore movement of the valve to the left will establish atmospheric pressure in the chamber 146 and vacuum in the chamber 143 thus resisting movement of the valve to the left in accordance with the fluid pressures in the two chambers 143 and 146, which will be the same as the pressures existing in the motor casings 33 and 34 respectively. Conversely, if the valve 68 is moved to the right, a partial vacuum will be established in the motor casing 34 and in the chamber 146, while atmospheric pressure will be present in the motor casing 33 and in the motor chamber 143.

In either direction of movement, therefore, the operator will feel a resistance to the movement of the valve which will be proportional to the differential pressures in the motor. When the diaphragm 39 is performing a shifting operation in which little resistance is encountered it requires only slight differential pressure to move the diaphragm 39 and the latter moves rapidly toward the end of the motor from which air is being exhausted to tend to satisfy the partial vacuum therein, and thus substantial differential pressure will not be built up. The same relatively small differential pressures will affect the "feel" diaphragm 144 to provide relatively slight resistance to movement of the valve 68. When increased shifting resistance is encountered, however, movement of the diaphragm 39 will take place less freely and movement of the diaphragm will be retarded with respect to the rate of exhaustion of air from one end of the motor, thus causing a drop in pressure in the latter end of the motor to increase differential pressures in the motor to move the diaphragm against the increased resistances to the shifting operation. The same increased differential pressures will be immediately established on opposite sides of the "feel" diaphragm 144, thus increasing the resistance felt by the operator against movement of the valve 68.

The "fluid pressure feel" means shown in Figure 8 has been found highly advantageous in operation, being superior to a "mechanical feel" system because of its sensitivity. The system in Figure 8, however, possesses a slight disadvantage in that when sudden and substantial resistances to the shifting operations are encountered, the diaphragm 144 slightly "cushions" the transmission of resistances to the hand of the operator thus preventing him from feeling the desired sharpness and suddenness of the resistances encountered in the shifting operations. At all other times, the mechanism of Figure 8 provides a remarkably exact reproduction of the resistances encountered in the shifting operations.

Accordingly, it will be apparent that whereas a "mechanical feel" system is advantageous in reproducing sudden substantial resistances but is not so accurate at other periods in the operation of the shifting mechanism, the characteristics of a "fluid pressure feel" system are directly the reverse in that it does not quite so accurately reproduce sudden and substantial resistances but is remarkably accurate at all other times. I have discovered that by combining a "mechanical feel" system with a "fluid pressure feel" system, the two systems combine to overcome the disadvantages inherent in each other and under every possible condition of operation, regardless of the position of any given shifting operation and regardless of the speed of movement of the handle lever, the resistances to the actual shifting operations are exactly reproduced at the handle lever to provide the latter with a remarkably accurate "feel." Thus the operator is enabled to feel his way into and out of any gear position with more accuracy than can be accomplished with either "feel" system alone.

It will be noted, that the motor-valve unit forms an important part of the present invention because of its simplicity of construction which permits economy in manufacture, and because of its ease and simplicity of assembly, which reduces labor costs in assembling the apparatus. The motor is first completely assembled with the diaphragm 39 in position and with all of the bolts 38 tightened, whereupon the valve unit is connected to the motor. The valve unit has no connection whatever with the motor except through the hook bolts 154, and accordingly the valve unit may be assembled with respect to the motor after the latter has been completely assembled. It merely is necessary to arrange the hooks of the bolts 154 in their openings, slide the valve unit in position, with the gasket 157 arranged on the inner face thereof, and then apply and tighten the nuts 155. This operation may be very quickly and easily performed, thus materially reducing assembly costs.

In this connection it will be noted that the valve mechanism and its arrangement with respect to the motor eliminates the necessity for the use of any piping connections between the valve mechanism and the motor. Such pipes themselves and their fittings not only add to the expense of manufacturing the parts of the mechanism, but they also require time for their assembly with respect to the valve mechanism and the motor. The openings 78 and 79 in the motor casings (Figure 4) and the openings 156 for the hook bolts obviously are easily formed in their proper positions and it merely is necessary to clamp the valve mechanism in position in the manner described to properly establish communication between the passages 76 and 77 and the respective ends of the motor, it being unnecessary to assemble any piping connections.

With further reference to the motor structure, attention is invited to Figures 13 and 17 showing the grooves or depressions 178 described above. One of these grooves is provided in each of the motor casing sections and extends from the associated port 175 or 176 toward the end of the respective casing section. In view of the substantial flexibility of the diaphragm it might be possible for this element to lie across and completely close one of the ports 175 or 176, thus preventing the exhaustion of air from one end of the motor. The groove 178 in each motor casing section assures communication at all times with the respective casing sections 33 and 34. In order to insure against the closure of either of the ports by the diaphragm without employing the arrangement of the groove 178, it would be necessary to arrange the ports 175 and 176 a substantially greater distance from the peripheral portion of the diaphragm, thus requiring the use of a substantially longer and consequently more expensive valve body.

It also will be apparent that the angular arrangement of the lever system as shown in Figures 2 and 5 facilitates the transmission of power to the gear set lever 25. The steering column is arranged further to the left of the center of the vehicle than the lever 25, and the angular arrangement of the parts facilitates the connection of the lever arm 103 to the lever 25.

While not essential to the present invention, attention is invited to the fact that the lost motion provided by the slot 111 (Figure 3) permits manual operation of the bell crank lever for moving the valve 68 independently of the power lever 99. In the event of failure of power in the motor, however, manual movement of the bell crank lever 105 will take up the play between the pin 109 and either end of the slot 111, depending upon the direction of turning movement of the lever 105, whereupon the operator may manually effect movement of the lever 99 to perform a shifting operation. Of course this requires the exertion of substantially greater force by the operator than when the apparatus is functioning properly, but it is intended to be only an emergency means for effecting a shifting operation.

From the foregoing it will be apparent that the present mechanism provides a highly efficient means for operating the shiftable members of a motor vehicle transmission and provides a motor-valve unit which includes a minimum number of parts which may be economically manufactured and assembled. It also will be apparent that the mechanism is particularly adapted to provide the operator with the highly desirable "feel" necessary to the proper performance of the various shifting operations. The nature of the mechanism is also such that it is impossible to accidently shift between first and reverse gears, such operation being possible only if the operator holds the handle 135 in its upper position toward the steering wheel when passing through neutral position.

The operation of the form of the invention shown in Figures 12 to 16 inclusive is substantially identical with the operation of the form of the invention shown in Figures 1 to 6 inclusive and need not be repeated in detail. It will be apparent that the clip 235 is operated by the plate 118 (Figure 1) upon turning movement of the handle lever 132 to rock the sleeve 124 (Figure 9). Such movement imparts endwise movement to the link 232 (Figure 13) to rock the bell crank lever 225 on the axis of the shaft 199 (Figure 16). Upon rocking movement of the bell crank lever 225, the bifurcated end of the bell crank lever transmits movement to the floating lever through the enlarged portion 220 thereof. Movement is thus imparted to the valve 183 to connect one end of the motor 32 to the atmosphere and the other end to the source of vacuum and the motor diaphragm will then actuate the rod 42 to impart movement to the pivot pin 213.

It will be apparent that this operation is the same as in the forms of the invention previously described, movement of the pivot pin 213 taking place in the same direction as movement is imparted to the floating lever 215 by the bell crank lever 225. Accordingly the force applied by the operator to the floating lever enlargement 220 and the force applied to the pivot pin 213 by the motor combine to deliver power to the pin 241 (Figures 13 and 16) thus turning the power lever 204 and causing the arm 205 thereof to transmit movement through the rod 208 to the shifting crank 25 (Figure 1). The leverage means thus performs the function of causing the operator to perform part of the work in operating the crank 25 and also transmits "feel" to the hand of the operator. Moreover it will be obvious that the leverage means causes a follow-up action to take place through which the motor diaphragm moves to an extent proportional to the extent of movement imparted to the handle lever 132 by the operator.

It will be apparent that either of the bell crank lever ends 228 or 229 will engage the floating lever enlargement 220, depending upon the direction of turning movement of the bell crank lever 225. Obviously, whenever movement of the handle 132 is stopped, the enlargement 220 becomes a fixed pivot whereupon a slight additional movement of the motor diaphragm will reverse the direction of movement of the lower end of the floating lever 215, thus restoring the valve 183 to its neutral position. It also will be apparent that in the event of a failure of power in the mechanism, the operator may swing the lever 132 sufficiently to cause the lever ends 228 or 229 to take up the play between such lever end and the end 240 of the power lever, after which continued movement of the hand lever 132 will transmit manual force to the power lever to perform the shifting operation.

The mechanism shown in Figures 12 to 16 inclusive possesses several distinct advantages. In the first place, it will be noted that the bracket 160 constitutes a single supporting element for the motor and for the leverage mechanism. The shaft 199 (Figure 16) which is carried by the support 160 acts as the pivotal support for both the power lever 204 and the bell crank lever 225. The floating lever 215 is supported with respect to the power lever by the pivot pin 241 as will be apparent from an examination of Figure 16. Accordingly it will be obvious that the entire structure comprising the motor, the valve mechanism and lever mechanism comprises a unit which may be completely assembled with respect to the support 160 prior to installation of the unit in the vehicle, and that the support 160 may be connected in position simply by bolting it to the lower end of the housing section 122 (Figure 9). Since the elements of the unit referred to may be assembled independently of the vehicle, it will be apparent that the time and consequently the expense involved in assembly may be materially reduced. It also will be apparent that the formation of the link 210 and floating lever 215 as double elements having parallel arms provides a structure wherein forces are evenly distributed to prevent any tendency for the parts to become distorted and set up a binding action.

Particular attention is also invited to the fact that the arm 205 of the power lever 204 has its free end offset horizontally a substantial distance from the vertical plane of the steering column, such end of the lever arm 205 being arranged approximately in a vertical plane extending longitudinally of the vehicle and passing through the shifting crank 25. Accordingly there is a direct delivery of power for turning the crank 25, the angular transmission of power being greatly eliminated together with a reduction in friction losses.

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. In combination with a transmission having a member shiftable into different transmission setting positions, a fluid pressure motor for moving said shiftable member, a manually operable handle, a valve mechanism for controlling said motor connected to said handle and to said motor to provide a follow-up action for said valve mechanism, motion transmitting means connecting said motor and said handle to said shiftable member whereby the operator, in moving said handle, performs a predetermined portion of the work required for moving said shiftable member, and fluid pressure operated means connected to resist movement of said handle to a degree proportional to differential pressures in said motor.

2. In combination with a transmission having a member shiftable into different transmission setting positions, a fluid pressure motor for moving said shiftable member, a manually operable handle, a valve mechanism for controlling said motor connected to said handle and to said motor to provide a follow-up action for said valve mechanism, motion transmitting means connecting said motor and said handle to said shiftable member whereby the operator, in moving said handle, performs a predetermined portion of the work required for moving said shiftable member, a casing, a diaphragm in said casing dividing it into chambers, said chambers communicating with opposite ends of said motor to establish fluid pressures in said chambers corresponding to the respective fluid pressures in the ends of said motor, and means connecting said diaphragm to resist movement of said handle in accordance with differential pressures affecting opposite sides of said diaphragm.

3. In combination with a transmission having a member shiftable into different transmission setting positions, a fluid pressure motor having a pressure movable member, a manually operable mechanism including a handle, motion transmitting means connected to said shiftable member, a floating lever connected at spaced points to said pressure movable member, said motion transmitting means and said manually operable mechanism whereby the operator, in moving said handle, performs a predetermined portion of the work required for moving said shiftable member upon actuation of said pressure movable member, a valve mechanism for controlling said motor connected to said floating lever whereby it is operated by said manually operable mechanism and partakes of a follow-up action upon operation of said pressure movable member, and a fluid pressure operated device connected to said manually operable mechanism to resist movement of said handle to a degree proportional to differential pressures in said motor.

4. In combination with a transmission having a member shiftable into different transmission setting positions, a fluid pressure motor having a pressure movable member, a manually operable mechanism including a handle, motion transmitting means connected to said shiftable member, a floating lever connected at spaced points to said pressure movable member, said motion transmitting means and said manually operable mechanism whereby the operator, in moving said handle, performs a predetermined portion of the work required for moving said shiftable member upon actuation of said pressure movable member, a valve mechanism for controlling said motor connected to said floating lever whereby it is operated by said manually operable mechanism and partakes of a follow-up action upon operation of said pressure movable member, a casing, a pressure responsive element dividing said casing to form a pair of chambers, said chambers respectively communicating with the ends of said motor, and means connecting said pressure responsive element to said manually operable mechanism to resist movement of said handle to a degree proportional to differential pressures in said motor.

5. In combination with a transmission having a member shiftable into different transmission setting positions, a fluid pressure motor having pressure responsive means including a diaphragm in said motor, a valve mechanism comprising a valve body and a valve therein, said valve body being secured against said motor and having fluid pressure passages communicating directly with the respective ends of said motor on opposite sides of said diaphragm, a manually operable mechanism including a handle, motion transmitting means connected to said shiftable member, a floating lever connected at spaced points to said pressure responsive means, said motion transmitting means and said manually operable mechanism whereby the operator, when moving said handle, performs a predetermined portion of the work required in moving said shiftable member, said floating lever being connected to said valve to move the latter upon operation of said handle and to cause the valve to partake of a follow-up action upon movement of said pressure responsive member, and fluid pressure operated means for resisting movement of said valve upon operation of said handle to a degree proportional to the differential pressures present in said motor.

6. In combination with a transmission having a member shiftable into different transmission setting positions, a fluid pressure motor having pressure responsive means including a diaphragm in said motor, a valve mechanism comprising a valve body and a valve therein, said valve body being secured against said motor and having fluid pressure passages communicating directly with the respective ends of said motor on opposite sides of said diaphragm, a manually operable mechanism including a handle, motion transmitting means connected to said shiftable member, a floating lever connected at spaced points to said pressure responsive means, said motion transmitting means and said manually operable mechanism whereby the operator, when moving said handle, performs a predetermined portion of the work required in moving said shiftable member, said floating lever being connected to said valve to move the latter upon operation of said handle and to cause the valve to partake of a follow-up action upon movement of said pressure responsive member, a casing, a pressure responsive element dividing said casing to form a pair of chambers communicating with opposite ends of said motor, and means connecting said pressure responsive element to resist manual movement of said valve in accordance with differential pressures affecting said element.

7. In combination with a transmission having a member shiftable into different transmission setting positions, a fluid pressure motor having pressure responsive means including a diaphragm in said motor, a valve mechanism comprising a valve body and a valve therein, said valve body being secured against said motor and having fluid pressure passages communicating directly with the respective ends of said motor on opposite sides of said diaphragm, a manually operable mechanism including a handle, motion transmitting means connected to said shiftable member, a floating lever connected at spaced points to said pressure responsive means, said motion transmitting means and said manually operable mechanism whereby the operator, when moving said handle, performs a predetermined portion of the work required in moving said shiftable member, said floating lever being connected to said valve to move the latter upon operation of said handle and to cause the valve to partake of a follow-up action upon movement of said pressure responsive member, a casing carried by said valve body, and a diaphragm dividing said casing to form a pair of chambers communicating with the respective ends of said motor, said diaphragm being connected to said valve to resist manual movement thereof in accordance with differential pressures affecting said last named diaphragm.

8. In a transmission operating mechanism, the combination with a motor vehicle steering column having a steering wheel at its upper end, of a manually operable member supported by the steering column for sliding movement parallel thereto and for rocking movement on an axis parallel to the steering column, means connected to utilize sliding movement of said manually operable member for controlling one function of the transmission, means connected to utilize rocking movement of said manually operable member in opposite directions from a neutral position to control another function of the transmission, a housing carried by the upper end of the steering column, a handle lever extending into said housing and connected and arranged with respect to said housing and said manually operable member whereby movement of said handle in two directions will effect the respective sliding and rocking movements of said manually operable member, and neutral detent means connected between said handle lever and said housing to locate the neutral position in the rocking movement of said manually operable member.

9. In a transmission operating mechanism, the combination with a motor vehicle steering column having a steering wheel at its upper end, of a manually operable member supported by the steering column for sliding movement parallel thereto and for rocking movement on an axis parallel to the steering column, means connected to utilize sliding movement of said manually operable member for controlling one function of the transmission, means connected to utilize rocking movement of said manually operable member in opposite directions from a neutral position to control another function of the transmission, a housing carried by the upper end of the steering column and provided with an arcuate opening concentric with the steering column, a handle lever projecting through said opening and having its inner end pivoted to said manually operable member on an axis perpendicular to the latter, a rocker carried by said handle lever and arranged in said opening whereby movement of said handle lever in a plane coincident with said manually operable member will effect slidable movement of the latter, and a neutral detent carried by said rocker, one edge of said opening having a notch receiving said spring detent when said manually operable member is rocked to its neutral position.

10. In combination with a motor vehicle steering column having a steering wheel at its upper end, and a transmission having a member shiftable into different transmission setting positions, a crank arranged adjacent the transmission and connected to actuate said shiftable member, the steering column being arranged forwardly of and laterally offset from said crank, a motor carried by the steering column, control means for said motor, a handle arranged adjacent the steering wheel, and motion transmitting mechanism connecting said handle, said control means, said motor and said crank whereby said motor is caused to partake of a follow-up action with respect to said handle, said motion transmitting mechanism comprising a member movably supported with respect to the steering column and having a portion offset therefrom and lying approximately in a vertical plane extending longitudinally of the vehicle and passing through said crank, and a rod connecting said portion of said last named member and said crank.

11. In combination with a motor vehicle steering column having a steering wheel at its upper end, and a transmission having a member shiftable into different transmission setting positions, a crank arranged adjacent the transmission and connected to actuate said shiftable member, the steering column being arranged forwardly of and laterally offset from said crank, a motor carried by the steering column, control means for said motor, a handle arranged adjacent the steering wheel, and motion transmitting mechanism connecting said handle, said control means, said motor and said crank whereby said motor is caused to partake of a follow-up action with respect to said handle, said motion transmitting mechanism comprising a power lever pivotally supported with respect to the steering column on a horizontal axis extending transversely of the vehicle, said lever having an end offset from the steering column and lying approximately in a vertical plane extending longitudinally of the vehicle and passing through said crank, and a rod connecting said crank to said end of said lever.

HENRY W. HEY.